(No Model.)  2 Sheets—Sheet 1.
E. W. YOUNG.
PNEUMATIC TIRE.
No. 566,113. Patented Aug. 18, 1896.
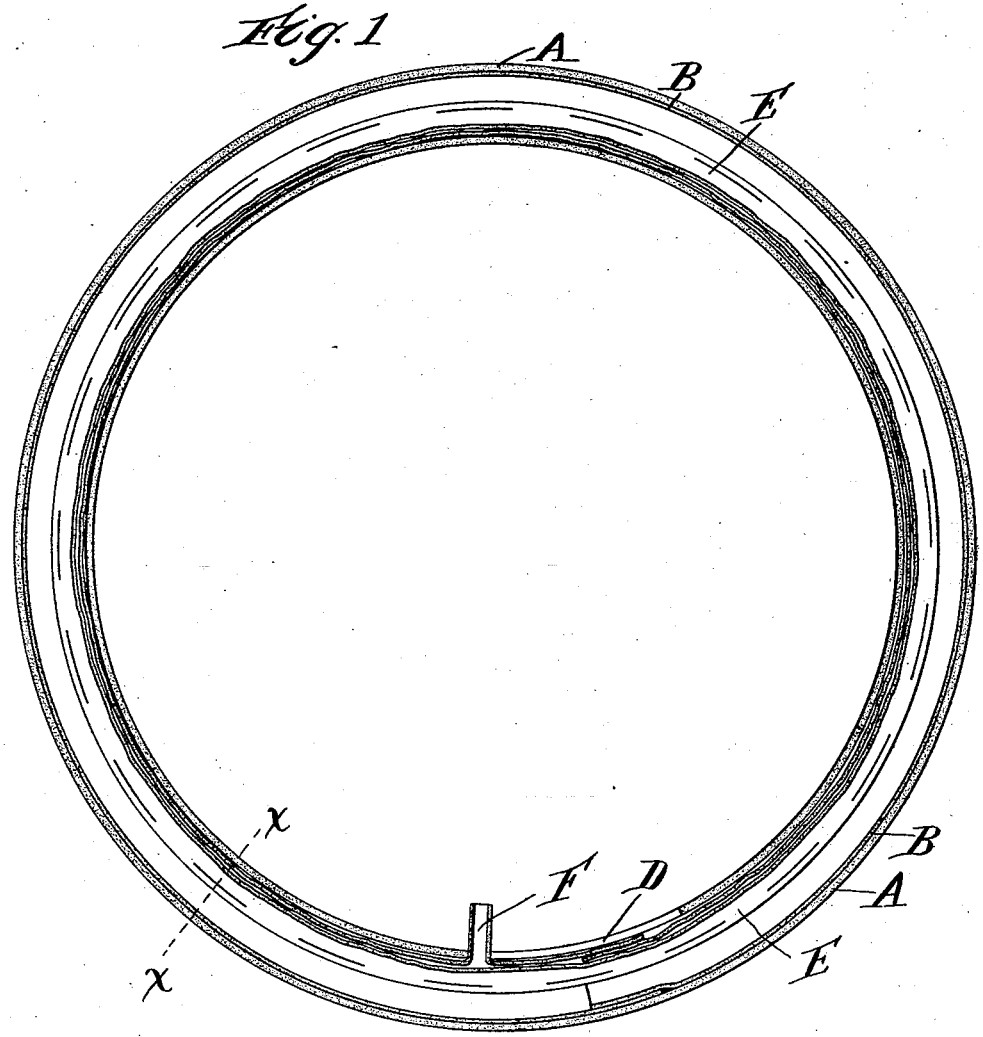
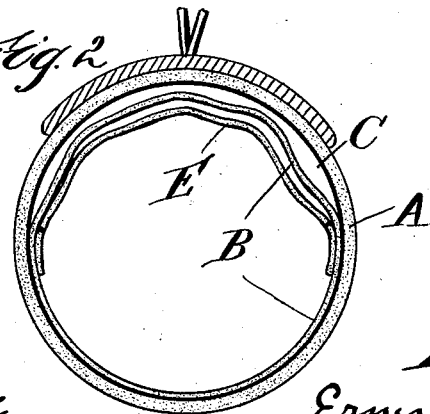
Witnesses:
A. F. Durand
Rita M. Wagner
Inventor:
Ernest W. Young
By Chas. J. Page. Atty.
THE NORRIS PETERS CO., PHOTO-LITHO., WASHINGTON, D. C.

(No Model.)
E. W. YOUNG.
PNEUMATIC TIRE.
No. 566,113.
2 Sheets—Sheet 2.
Patented Aug. 18, 1896.
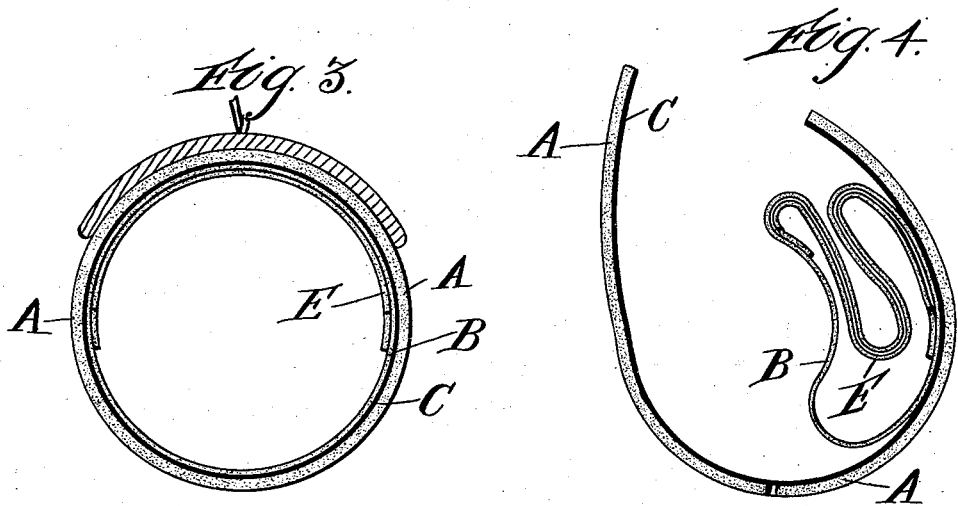
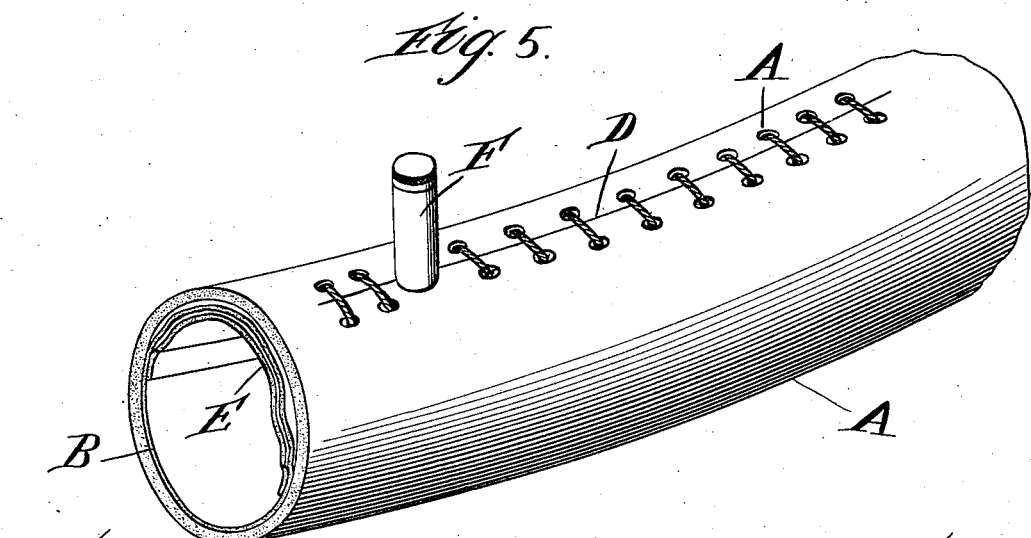

UNITED STATES PATENT OFFICE.

ERNEST W. YOUNG, OF AUSTIN, ILLINOIS, ASSIGNOR TO THE MORGAN & WRIGHT, OF CHICAGO, ILLINOIS.

PNEUMATIC TIRE.

SPECIFICATION forming part of Letters Patent No. 566,113, dated August 18, 1896.

Application filed August 8, 1895. Serial No. 558,684. (No model.)

*To all whom it may concern:*

Be it known that I, ERNEST W. YOUNG, a citizen of the United States, residing at Austin, in the county of Cook and State of Illinois, have invented a certain new and useful Improvement in Pneumatic Tires, of which the following is a specification.

Pneumatic tires as now generally on the market are either of the "one-tube" or "two-tube" type, the former being also commonly known as the "hose-pipe" tire. A tire of the two-tube kind comprises a sheath and an inner inflatable air-tube which can be removed from the sheath for purposes of repair, and with such construction the sheath or casing commonly consists of an inner layer or layers of fabric and outer layer of rubber. In a tire of the one-tube or hose-pipe type the feature of a removable inner air-tube is not present, and the annular tubular structure which forms the tire is usually composed of an outer tubular layer of rubber, a next succeeding tubular layer or layers of fabric, and an inner tubular layer of rubber, all vulcanized together so as to form a composite tube. So far as I am aware the general and approved methods of forming such hose-pipe tires consists in forming the several tubular layers upon a mandrel, removing the composite tube from the mandrel with the ends of the tube open, placing such tube in a flattened condition about a drum and splicing together the ends of the tube, and then vulcanizing the tube so as to unite its several layers and spliced ends, or as an alternative of such method the tire in place of being placed upon the drum is bent into annular form and spliced at its ends, and while being vulcanized is subjected to internal fluid-pressure. These methods involve various objections well known to those skilled in the art, and in both instances the work is slow and laborious and involves great care and nicety, particularly in forming the splice or joint between the ends of the tube, it being necessary to produce a perfect article in order to avoid leakage when the tire is inflated.

My invention contemplates a simpler and more rapid method of producing hose-pipe tires, and it also contemplates certain matters of further improvement, as hereinafter set forth.

In the accompanying drawings, Figure 1 is a section taken longitudinally through a pneumatic tire constructed in accordance with my invention. Fig. 2 is a section taken transversely through the tire on line *x x* in Fig. 1, the section being on a larger scale and portion of the wheel-rim being included. In this view the inner tubular layer and a patching-ply employed are shown somewhat wrinkled in order to illustrate the unattached portions of said tubular layer and patching-ply. Fig. 3 is a like view showing the unattached portions of the layer and patching-ply in a smooth condition. Fig. 4 is a section on a like scale, taken through the pneumatic tire on line 4 4 in Fig. 1 and illustrative of the way in which the tire can be opened for the purpose of repairing a cut or puncture. Fig. 5 is a perspective view of a portion of the pneumatic tire.

The annular tubular tire is preferably composed of rubber and fabric, A indicating the outer layer of rubber, B the inner tubular layer of rubber, and C the layer of fabric interposed between the inner and outer layers of rubber, the layer C of fabric being represented by a heavy black line.

In making the tire I first form and vulcanize upon an annular mandrel an endless seamless tubular structure composed of the outer layer A, of rubber, and the succeeding layer C, of fabric, the approved mode of operation involved in such step being first to apply the fabric to the mandrel and then to apply the rubber. This can be readily and easily accomplished, since, for example, the strip of fabric can be laid upon a table and the mandrel can be rolled along the same, and while thus rolling along the mandrel the fabric can be wrapped upon the same. After thus applying the fabric the strip of rubber can be similarly applied. The fabric could be wound upon the mandrel and more than one layer of fabric could be used, the simpler way, however, being to spread out the fabric and roll the mandrel along the same. After being thus prepared upon the mandrel the tubular structure can be vulcanized, either in a mold under pressure, or it can be wrapped with muslin or the like and vulcanized in the open steam. I then make a short slit through this tubular structure, as at D, and strip the same from the mandrel, which latter leaves the tubular structure by way of such sheath. To permit such removal, the mandrel may have a removable or hinged or swiveled section, or if it is sufficiently springy it can be transversely divided at one point and have normally butting ends, all of such constructions of mandrels being known in the art of producing sheaths for two-tube tires and illustrated in principle in Letters Patent of the United States No. 490,035 to Morgan and Wright. It will be observed, however, that the foregoing-described step involved in my method is directed to the ultimate production of what is known in the art as a "one-tube" or "hose-pipe" tire. After removing the tubular structure thus formed from the mandrel I introduce through the said slit a previously-prepared thin rubber tube having open ends, and after such tube has been drawn within the tubular structure, so as to extend entirely throughout the base of the same, I telescope or join in an equivalent way the ends of such thin rubber tube. This thin rubber tube is adapted to form the inner tubular layer B of the tire, which latter becomes in effect a one-tube or hose-pipe tire after this tubular layer has become united to the inner layer of fabric. In order to cause the inner tubular layer of rubber to unite with the layer of fabric, I introduce through the slit at D a suitable quantity of liquid cement in any suitable way. I can, for example, employ a bent cement-ejector of suitable length, and, if desired, I can also form one or more short slits at other points along the base of the tire, so that the cement can be introduced at two or more points, it being observed that such slits may be so small and so few in number that the integrity of the tubular seamless structure will not be materially affected. As another way I can introduce a suitable quantity of thin liquid cement and hold and turn the tubular structure in a way to cause the cement to traverse the entire inner side of the tread portion of such tubular structure whereby it will pass between such inner side of the tubular structure and the outer side of the inner tubular layer B of rubber. The tire can then be inflated through a suitable valved nipple F, preferably applied to the tubular layer B preparatory to introducing the latter within the tubular structure composed of an outer layer of rubber and an inner layer of fabric. The inflation of the tire causes the inner tubular layer to be compressed against the tubular layer of fabric, and hence the two layers will be united along their connected portions. Should a puncture or serious tear or cut be made in the tire at any point along its tread, the tire can be removed from the wheel-rim, and access can be had to the point where such rupture occurs in the layer of fabric by cutting open a portion of the tire along its base and stripping a portion of the inner tubular layer from the fabric, as in Fig. 4. It will be seen that the portion of the inner tubular rubber layer B which lies at the base side of the tire is uncemented, and hence that the tire can be cut through the layers A and C at any point along the base of the tire without cutting through the inner tubular layer of rubber; also that after a repair has been made the portion of the inner layer B which has been stripped from the layer of fabric, as in Fig. 4, can be again cemented to the fabric. The cut or puncture made in the tread of the tire, as aforesaid, will therefore have only injured the portion of the inner tubular layer next to the tread, and while the means employed for closing such puncture will serve to repair the tire I provide as a safeguard a slack patching-ply E, which operates as in Letters Patent of the United States Nos. 527,097 and 543,074, heretofore granted to me. The tubular layer B is provided with this patching-ply previous to the introduction of the tubular layer through the slit D. When, therefore, the tire is completed, it consists of a one-tube or hose-pipe tire having its inner rubber layer slack along the base of the tire, and also containing a slack flexible patching-ply which normally lies next to the slack portion of the inner layer B or away from the tread side of the tire, so as to escape puncture when the tread side of the tire becomes injured, and this patching-ply can at any point along its length be picked up and cemented to a puncture or ruptured portion of the inner layer B.

While I have in my said patents referred to the application of my improved patching-ply to a one-tube or hose-pipe tire, I regard its use and application in a hose-pipe tire of the present construction as a matter of further specific improvement, it being observed that my present invention involves not only a method of applying the patching-ply to a hose-pipe tire which can be opened at any point along its base without injuring the patching-ply, but also a novel method of fitting a hose-pipe tire with the patching-ply. When any portion of the patching-ply is picked up and cemented to the layer B at the tread side of the tire, the subsequent inflation of the tire will not tend to force the portion of the patching-ply thus cemented to the layer B away from the latter, for the reason that the gaps, perforations, or apertures provided for the passage of air between such spaces as may exist between opposite sides of the patching-ply will permit the establishment of an equilibrium of pressure at both sides of the portion of the patching-ply adjacent to its portion which is cemented to the punctured part of the layer B. These passages can be formed in any of the ways suggested in my said patents, or in any other suitable or equivalent way, it being observed that for convenience I have selected the mode of forming the patching-ply of a strip and securing the same at intervals along its longitudinal edge portions.

It is also understood that in accordance with my invention I produce a one-tube pneumatic tire comprising an endless and substantially seamless tubular structure formed of rubber and fabric and characterized by formation and vulcanization upon an annular mandrel and having an inner layer of vulcanized rubber united with the layer of fabric by cement, and that, broadly considered, the cement introduced through the limited split or splits in said tubular structure may be applied to the entire inner wall of the tubular layer of fabric, so that by inflating the tire after the introduction of the cement the said two layers will be united substantially as one piece throughout.

By introducing the tubular layer into the annular tubular structure composed of rubber-covered fabric the tubular layer can be of sufficient length to allow its ends to be telescoped.

What I claim as my invention is—

The within-described method of producing one-tube pneumatic tires, consisting in forming and vulcanizing upon an annular mandrel an endless, seamless tubular structure composed of rubber and fabric, opening such structure to a limited extent and causing the mandrel to part from the same by way of such limited opening, introducing a tubular rubber layer through said limited opening and uniting the ends thereof so as to form an endless, annular, tubular rubber layer within the said tubular structure, cementing the outer side of the tubular layer to the inner side of the tubular structure wherein it has been so arranged, and compressing together the cemented sides by inflation.

ERNEST W. YOUNG.

Witnesses:
ARTHUR F. DURAND,
RETA M. WAGNER.